United States Patent [19]

Yagii et al.

[11] Patent Number: 4,695,699

[45] Date of Patent: Sep. 22, 1987

[54] METHOD OF MAKING COMPOSITE MEMBER

[75] Inventors: Koji Yagii; Jun Miyata; Shunzo Takasuga, all of Hiroshima, Japan

[73] Assignee: Mazda Motor Corporation, Japan

[21] Appl. No.: 854,382

[22] Filed: Apr. 21, 1986

[30] Foreign Application Priority Data

Apr. 30, 1985 [JP] Japan .................................. 60-90967

[51] Int. Cl.⁴ ...................... B23K 28/02; B23K 26/00; B23K 20/14
[52] U.S. Cl. .............................. 219/121 LD; 228/186; 228/193; 228/231
[58] Field of Search ............... 228/193, 231, 170, 186, 228/243; 427/376.3, 376.6; 219/121 ED, 121 LD

[56] References Cited

U.S. PATENT DOCUMENTS

| | | | |
|---|---|---|---|
| 3,493,476 | 2/1970 | Lucas et al. | 228/193 X |
| 3,787,959 | 1/1974 | Moore | 228/193 X |
| 3,894,674 | 7/1975 | Weill | 228/170 X |
| 4,247,036 | 1/1981 | Salesse et al. | 228/195 X |
| 4,281,235 | 7/1981 | Peloquin | 228/121 LD X |
| 4,319,121 | 3/1982 | Yoshida | 219/121 ED |

FOREIGN PATENT DOCUMENTS 56-77374  6/1981  Japan .
50177  3/1984  Japan .................... 228/193

*Primary Examiner*—Kenneth J. Ramsey
*Attorney, Agent, or Firm*—Gerald J. Ferguson, Jr.; Michael P. Hoffman; Ronni S. Malamud

[57] ABSTRACT

A composite member is made by fitting a functional member constituted by an aluminum composite material capable of providing a desired target function to a recess of a base material constituted by an aluminum alloy and provided with the recess on the surface required to exhibit the desired target function. The entire peripheral section exposed at the outer surface among the joining sections of the base material with the functional member is beam-welded in a non-oxidizing atmosphere. The beam-welded base material and the functional member are then subjected to diffusion bonding by pressing them at least in the fitting direction and heating them.

5 Claims, 5 Drawing Figures

METHOD OF MAKING COMPOSITE MEMBER

BACKGROUND OF THE INVENTION

1. Field of the Invention

This invention relates to a method of making a composite member by forming a base material constituted by an aluminum alloy integrally with a composite member constituted by an aluminum composite material corresponding to a desired target function.

2. Description of the Prior Art

In recent years, aluminum alloys have been increasingly employed for mechanical structures such as cylinder heads of reciprocating engines for decreasing weight. In the mechanical structure fabricated of an aluminum alloy, it is often required to impart a desired target function to specific parts thereof in order, for example, to improve the resistance to wear or resistance to thermal fatigue.

To meet this requirements, the practice has been to coat a predetermined surface of a base material formed of an aluminum alloy with a metal corresponding to the target function, for example, Mo or 0.8C-Fe for improving the resistance to wear, by gas sputtering. It has also been proposed, for example, in Japanese Unexamined Patent Publication No. 56(1981)-77374, to form an aluminum-aluminum nitride mixture layer on the surface of an aluminum material by a plasma spray method, and to form a covering layer by firing. As the means for imparting the target function to the base material, the brazing method or the hot pressing method may also be used. However, in the case where the area of the surface to which the target function has to be imparted is large or the shape of the base material is complicated, air bubbles arise at the bonding section when brazing is conducted, and the bonding strength becomes low. Further, when the shape of the base material is complicated, the hot pressing method cannot be used.

Particularly, in recent years, mechanical structures are mostly formed into a complicated shape by casting, and the area of the surface to which the target function has to be imparted is made large. Therefore, in many cases, the coating method is employed.

However, in the conventional coating method based on sputtering or plasma spraying, adhesion of the metal for imparting the target function to the base material is low. Therefore, the coating layer readily peels off, and the durability is low. Particularly, in the case where high resistance to wear is required as the target function for slideways or the like, the peeling-off of the coating layer is readily caused by repetitive sliding.

SUMMARY OF THE INVENTION

The primary object of the present invention is to provide a method of making a composite member wherein a desired target function is imparted to a wide area at a predetermined position of a base material constituted by an aluminum alloy.

Another object of the invention is to provide a method of making a composite member which is able to achieve the aforesaid primary object even though the shape of the base material is complicated.

Another object of the present invention is to provide a method of making a composite member wherein a target function imparted to the base material endures for long periods.

In the method of the present invention, basically, a section which is to be imparted with a target function required for the surface of a base material is constituted by a functional member consisting of an aluminum composite material capable of providing the target function, and the base material and the functional member are secured to each other by fitting. The base material and the functional member secured to each other by fitting are firmly integrated with each other as a whole by beam welding and diffusion bonding in accordance with the fitting position.

The present invention provides a method of making a composite member, which comprises the steps of:

(i) fitting a functional member constituted by an aluminum composite material corresponding to a desired target function to a recess of a base material constituted by an aluminum alloy and provided with said recess on a surface required to exhibit said desired target function, (ii) beam-welding, in a non-oxidizing atmosphere, the entire peripheral section exposed at the outer surface among the joining sections of said base material with said functional member by said fitting, and (iii) subjecting said beam-welded base material and said functional member to diffusion bonding by pressing them at least in the fitting direction and heating them.

By the method of the present invention, it is possible to impart a desired target function to a wide area of the surface of the base material constituted by an aluminum alloy, and to obtain a bonding strength higher than by a coating method.

Further, unlike the case where coating is conducted on the surface of the base material, since the base material and the functional member are secured by fitting, the composite member obtained by the method of the present invention exhibits high resistance to external force, particularly external force exerted along the surface of the functional member generated by sliding or the like.

Also, since the joining section of the base material with the functional member is fusion bonded by beam welding, it is possible to weld the base material with the functional member firmly by eliminating adverse thermal effects on the fitting sections outside of the welded joining section. Since beam welding is conducted in an non-oxdizing atmosphere, it is also possible to increase sufficiently the bonding strength at the beam-welded section.

Also, it is possible to accomplish diffusion bonding satisfactorily since the joining section of the base material with the functional member is beam-welded around its entire periphery, i.e. since the space formed at the fitting sections between the base material and the functional member is shielded from the external atmosphere. Further, in the case where diffusion bonding is effected by hot isostatic pressing (HIP processing), diffusion bonding may be conducted satisfactorily by eliminating the problem that the base material and the functional member are separated from each other by the holding pressure during the HIP processing.

DESCRIPTION OF THE PREFERRED EMBODIMENTS

The present invention will hereinbelow be described in further detail with reference to the accompanying drawings.

Figure 5:
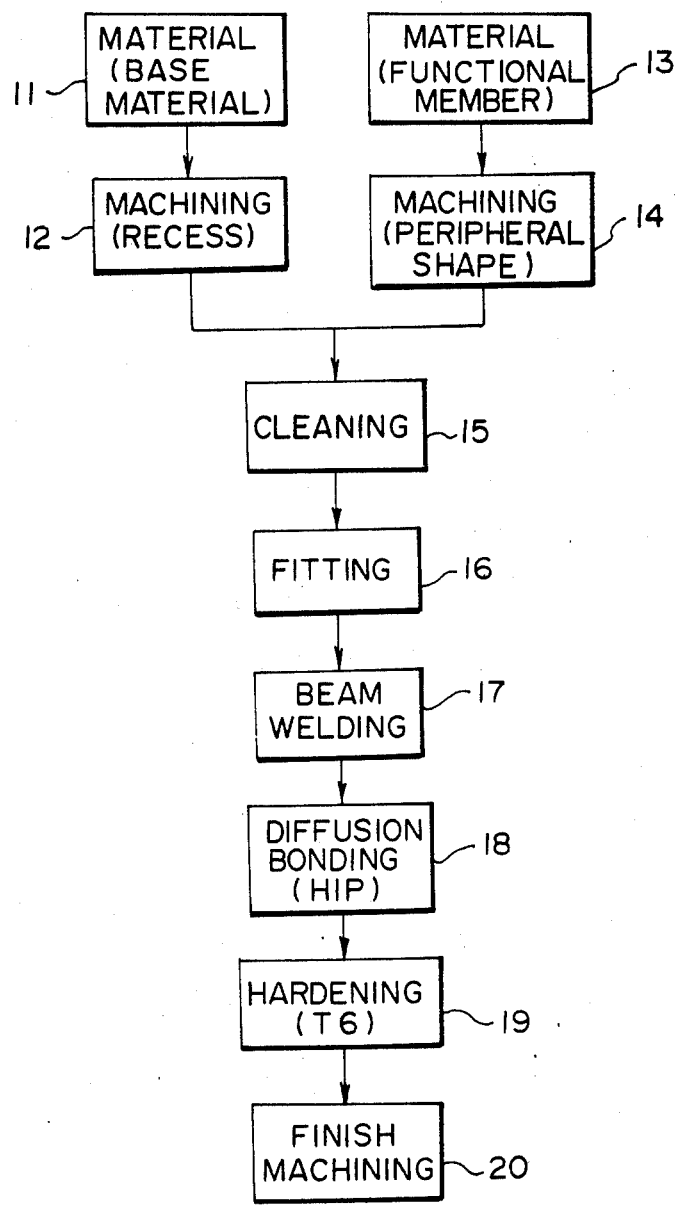
FIG. 5 is a block diagram showing the process sequence in an embodiment of the method in accordance with the present invention.

Main steps shown in FIGS. 1 to 4 will be described with reference to FIG. 5 showing steps 11 to 20.

Figure 1:
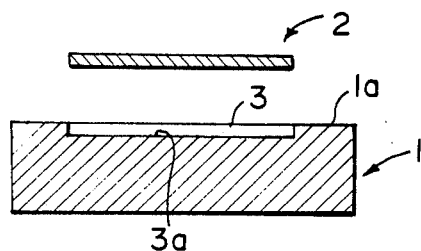
FIGS. 1 to 4 are sectional views showing the main steps of the method in accordance with the present invention.

Referring to FIG. 1, a base material 1 is formed into a predetermined shape by casting of an aluminum alloy (step 11). The base material 1 has a center portion on the side of a surface 1a, which has to be imparted with a target function such as resistance to wear or resistance to thermal fatigue. A recess 3 is formed at the center portion on the surface 1a of the base material 1. The recess 3 is formed by machining (Step 12) after casting so as to have a uniform depth as a whole, for example, a depth of approximately 2 mm.

On the other hand, a functional member 2 is formed into a sheet shape by use of an aluminum composite material having a property corresponding to the target function, for example, an Al-Si hyper eutectic alloy (i.e., and Al-Si alloy of a hyper eutectic composition having a high Si content) or a material comprising an aluminum alloy and ceramic powder or fibers containing SiC as a major constituent (Step 13). The functional member 2 is formed to match the shape and the depth of the recess 3. Namely, the functional member 2 is machined so that its peripheral shape is approximately equal to the peripheral shape of the recess 3 and its thickness is equal to the depth of the recess 3 (Step 14).

Surfaces of the base material 1 and the functional members 2 thus formed are cleaned to remove oxides and stains by immersion in an alkaline solvent and application of ultrasonic waves (Step 15).

Figure 2:
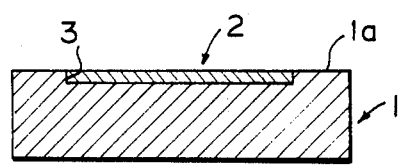

Thereafter, as shown in FIG. 2, the functional member 2 is fitted into the recess 3 of the base material 1 (Step 16). In the preceding Step 12 and 14, the recess 3 and the functional member 2 are formed so that the functional member 2 fits snugly to the recess 3 when the functional member 2 is slightly pressed in the Step 16.

Figure 3:
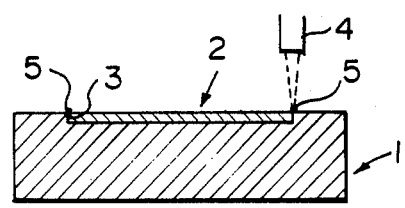
Figure 4:
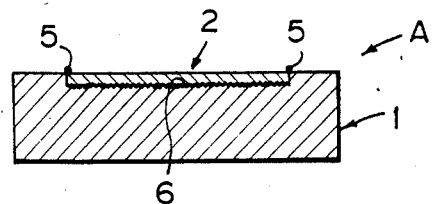

After the functional member 2 is fitted to the recess 3 of the base material 1 as described above, beam welding is conducted at the joining section exposed to the exterior, i.e. the entire peripheral section thereof open at the surface 1a of the base material 1 among small spaces between the base material 1 and the functional member 2 formed at the peripheral portion of the functional member 2 (Step 17). As shown in FIG. 3, beam welding is conducted in an non-oxidizing atmosphere, for example, in a vacuum or in an inert gas atmosphere, by concentrating a high-density energy beam at the welding point only by use of a beam welding machine 4 such as an electron beam welding machine or a laser beam welding machine. In FIG. 3, the section thus welded by beam welding is designated by reference numeral 5. The small space formed at the fitting section between the base material 1 and the functional member 2 is completely shielded (sealed) from the ambient atmosphere by the welded section 5.

After the beam welding, the base material 1 and the functional member 2 are pressed together at least in the fitting direction (i.e. vertically in FIGS. 1 to 4), and are heated. In this way, the base material 1 and the functional member 2 are diffusion-bonded together (Step 18). The diffusion-bonded section is designated by reference numeral 6 in FIG. 4. The diffusion bonding is conducted, for example, by the HIP processing, i.e. by housing the base material 1 and the functional member 2 beam-welded as shown in FIG. 3 in an enclosed vessel, and heating them while a pressurizing gas is introduced into the vessel. The HIP processing is advantageous for the diffusion bonding since it is applicable also to the case where a mechanical force cannot be applied in the fitting direction, and the functional member 2 may be pressed against the base material 1 at a generally uniform pressure by the pressurizing gas. The diffusion bonding is effected mainly at the section corresponding to a bottom surface 3a of the recess 3 shown in FIG. 1. The HIP processing should preferably be conducted at a heating temperature within the range of 450° to 550° C. and at a pressure within the range of 200 to 1,500 kgf/cm$^2$ for a heat holding period within the range of 30 minutes to 3 hours. When the heating temperature is lower than 450° C., the diffusion bonding becomes insufficient. When the heating temperature is higher than 550° C., the aluminum alloy base material softens and deforms. When the heat holding period is shorter than 30 minutes, the diffusion bonding becomes insufficient. Further, it is not economical to heat for longer than 3 hours. The diffusion bonding becomes insufficient when the pressure is lower than 200 kgf/cm$^2$, and it is not economical to use a pressure higher than 1,500 kgf/cm$^2$.

Thereafter, a hardening processing, i.e. the T6 processing, which is generally used for mechanical aluminum alloy structure, is conducted (Step 19), and the surface 1a of the base material 1 at which the functional member 2 is exposed is finished by machining to a desired dimension (Step 20), thereby obtaining a final product A. In the finish machining, the base material 1 may be machined easily by the ordinary cutting method, and the functional member 2 may be subjected to grinding.

The final product A, i.e. the composite member comprising the base material 1 and the functional member 2, is obtained in this manner, and the surface of the functional member 2 is used as a wear-proof layer. In the case where the composite member is used in an environment where the temperature changes, i.e. where the thermal load changes, the aluminum alloy constituting the base material 1 and the aluminum composite material constituting the functional member 2 should be selected so that the difference in coefficient of thermal expansion therebetween is as small as possible. In this case, for preventing generation of stress tending to make the recess 3 narrower (stress compressing the functional member 2 from the periphery), it is advantageous that the coefficient of thermal expansion of the functional member 2 be smaller than the coefficient of thermal expansion of the base material 1.

The present invention will further be illustrated by the following non-limitative example.

A composite member was made under the conditions described below.

(1) Base material 1

Material: AC4A exhibiting a coefficient of thermal expansion of $21 \times 10^{-6}$ to $23 \times 10^{-6}$/° C.

Shape: A disk shape having a diameter of 90 mm and a thickness of 6 mm.

(2) Recess 3

A recess having a diameter of 70 mm and a depth of 2 mm, which is concentric with respect to the base material 1.

(3) Functional member 2

Material: hypersilmin alloy (A390) exhibiting a coefficient of thermal expansion of $17 \times 10^{-6}$ to $18 \times 10^{-6}$/°C. (Composition: 16% to 18% of Si, 4% to 5% of Cu, 0.1% of Mn, 0.45% to 0.65% of Mg, 0.1% of Zn, 0.2% of Ti, and the remainder of Al).

Shape: A disk shape having a diameter of 70 mm and a thickness of 2 mm and fittable into the recess 3 by slight pressing.

(4) Step 15 (cleaning)

Cleaning for 10 minutes with ultrasonic waves in a weak alkaline washing liquid.

(5) Step 17 (beam welding)

Non-oxidizing atmosphere: Vacuum ($5 \times 10^{-2}$ Torr).

Beam welding: Electron beam welding at an acceleration voltage of 60 kV, a beam current of 16 mA, and a welding speed of 1.0 m/minute.

(6) Step 18 (diffusion bonding)

The HIP processing was employed.

Atmosphere: Ar gas.

Holding temperature and period: 500° C. $\times$ 1 hour.

Holding pressure: 1,000 kgf/cm$^2$.

Processing pattern: Heating prior to pressurizing.

(7) Step 19 (hardening processing)

The T6 processing was employed.

Fusing: 500° C. $\times$ 3 hours (hardening with water).

Tempering: 180° C. $\times$ 6 hours (air cooling).

The composite member obtained in this way after the Step 19 (T6 processing) was investigated, and it was found that no cracking arose in the base material 1 or the functional member 2, and a good product was obtained. The results were the same also when a 30 wt. % Si-Al alloy composite material or a 15 vol. % SiC fiber-Al composite material (coefficient of thermal expansion: $14 \times 10^{-6}$ to $15 \times 10^{-6}$/° C.) was used as the functional member 2.

We claim:

1. A method of making a composite member, which comprises the steps of:
   (i) fitting a functional member constituted by an aluminum composite material capable of providing a desired target function to a recess of a base material constituted by an aluminum alloy and having said recess on a surface required to exhibit said desired target function,
   (ii) beam-welding, in a non-oxidizing atmosphere, the entire peripheral section exposed at the outer surface among the joining sections of said base material with said functional member, and
   (iii) subjecting said beam-welded base material and said functional member to diffusion bonding by pressing them at least in the fitting direction and heating them.

2. A method as defined in claim 1 wherein said diffusion bonding is conducted at a heating temperature within the range of 450° to 550° C. and a holding pressure within the range of 200 to 1,500 kgf/cm$^2$ for a heat holding period within the range of 0.5 to three hours.

3. A method as defined in claim 1 wherein hardening heat treatment and finish processing are conducted after said diffusion bonding.

4. A method as defined in claim 1 wherein said functional member is constituted by an Al-Si hyper eutectic alloy.

5. A method as defined in claim 1 wherein said beam welding is electron beam welding.

* * * * *